United States Patent [19]
Issitt

[11] Patent Number: 6,082,042
[45] Date of Patent: *Jul. 4, 2000

[54] TAMPER RESISTANT BAIT STATION FOR RATS

[75] Inventor: Nicholas Issitt, Rutland, United Kingdom

[73] Assignee: Aegis Research Inc., Dover, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/972,525

[22] Filed: Nov. 18, 1997

[51] Int. Cl.⁷ .................................................. A01M 25/00
[52] U.S. Cl. .................................... 43/131; 229/DIG. 38; 229/116; 70/160
[58] Field of Search ................................ 43/58, 121, 124, 43/131, 64; 292/300, 302, 303, DIG. 38, 116, 117, 119; 70/159, 160, 344, 387, 345, 346, 158; 220/326, 322, 324, 210, 297, 298, 203.22; 411/349, 508, 913; 24/328, 330

[56] References Cited

U.S. PATENT DOCUMENTS

| | | |
|---|---|---|
| 794,323 | 7/1905 | Small . |
| 3,075,627 | 1/1963 | Kuckhoff . |
| 4,026,064 | 5/1977 | Baker ........................................ 43/131 |
| 4,031,653 | 6/1977 | Jordan . |
| 4,349,982 | 9/1982 | Sherman ................... 43/131 |
| 4,541,198 | 9/1985 | Sherman . |
| 4,563,836 | 1/1986 | Woodruff et al. ......................... 43/131 |
| 4,637,162 | 1/1987 | Sherman . |
| 4,706,808 | 11/1987 | Guetersloh . |
| 4,825,581 | 5/1989 | Dailey ..................................... 43/131 |
| 5,040,327 | 8/1991 | Stack et al. . |
| 5,272,832 | 12/1993 | Marshall et al. . |
| 5,448,852 | 9/1995 | Spragins et al. . |
| 5,669,108 | 9/1997 | Ferrari .................................... 411/349 |
| 5,806,237 | 9/1998 | Nelson et al. ............................ 43/131 |

*Primary Examiner*—Jack W. Lavinder
*Attorney, Agent, or Firm*—Juettner, Pyle & Piontek

[57] ABSTRACT

A bait station for containing rat poison contains a housing; at least one opening in the housing for a rat to enter; and a bait position in the housing for locating poisoned bait. A divider is provided between the bait position and each opening to prevent direct access to the bait from the opening, for example by a child. However, there are at least two different routes from the bait position leading to openings. Research has shown that rats, unlike mice, prefer not to eat in a confined space and it is believed that the choice of escape routes offered by the bait station of the invention encourages a rat to eat more of the bait. The bait station may include a hinged lid with locking means to prevent tampering with the bait.

13 Claims, 8 Drawing Sheets

TAMPER RESISTANT BAIT STATION FOR RATS

BACKGROUND OF THE INVENTION (1) Field of the Invention

The invention relates to tamper resistant bait stations in which poisoned bait is left for consumption by rats.

(2) Description of the Prior Art

Bait stations in the form of enclosed units containing poisoned bait are commonly used for killing rats and mice. The rat or mouse enters the bait station, eats the bait and dies two to three days later. By the time it dies, the animal has digested all the bait so another animal which eats the dead rodent is not poisoned. Such bait stations are preferable to traps which retain the rodent, as they can be used to kill several animals without requiring constant monitoring.

A preferred type of bait station is designed such that a child cannot open the unit, and cannot gain access to the bait by reaching into the unit.

Research has been carried out with mice to find a shape of bait station in which the mouse feels secure, and eats sufficient poisoned bait to kill it. If a mouse eats only a small amount of the bait it may survive. It has been found that mice prefer to eat in a bait station which contains a passageway between two openings in its housing, and a separate side feeding compartment containing the bait. The compartment is separated from the passageway by a divider which contains a central gap to allow the mouse access to the feeding compartment. Thus, there is just one route (through the central gap in the divider) from the feeding compartment to either of the openings in the bait station housing. It is presumed that the mouse can eat in this compartment without fearing attack from larger predators. In contrast, a mouse will not eat in a compartment shaped as a straight tunnel.

It has previously been assumed that rats prefer feeding in the same kind of environment as mice and therefore both rat and mouse bait stations have been made with a separate side feeding compartment in which the animal sits to eat the bait.

BRIEF SUMMARY OF THE INVENTION

The invention provides a bait station for containing a poisoned bait for rats, the bait station comprising a housing, an opening in the housing, a bait position for locating the bait within the housing, a divider between the opening and the bait position; wherein there are at least two different routes through or around the divider from the bait position to the opening.

Each route must allow the passage of an average sized rat.

This contrasts with a prior art bait station in which there is only one route from a bait position in the feeding compartment to the openings in the housing.

Research carried out by the inventors has surprisingly demonstrated that rats prefer to feed in a very different environment to mice. Rats have been found to prefer feeding where there are at least two exits from any enclosed space. For example, a rat is happy feeding in a hollow tube. The inventors believe this to be because rats are afraid of attack by other rats.

A tubular shape is not acceptable for a bait station, since it allows a child to reach in and grasp the bait. A bait station according to the invention therefore includes a divider located between each opening in the housing of the bait station and the bait position, but ensures that the divider allows at least two different routes from the bait position to the opening. The divider should preferably be located such that it is impossible to poke a straight object through the opening and contact any bait located in the bait position.

In one embodiment of the invention, there is a single divider, which has a central hole, and each edge of which is spaced from the walls of the housing of the bait station. Thus a rat may pass from the bait position to an opening via the central hole in the divider or around either edge of the divider.

Alternatively separate dividers may be provided between each opening in the housing and the bait position.

The divider or dividers may be transparent to increase the rat's feeling that it is not dangerously enclosed, and to give it sight of any other rats entering the bait station.

The divider or dividers are preferably removable to allow for easy stacking of the bait stations in transit.

An upper lid portion of the bait station housing may be transparent or have transparent panels. These allow an inspector to check that the station still contains enough bait and/or to see if a rat is in the station without having to remove the lid. A panel may also be used to record information such as when the bait station was last checked. This may be a transparent panel with a suitable sticker on its inside, or a plain coloured panel, either of which can be written on with a suitable pen.

It is important that unauthorized people, especially children, cannot open up the bait station to gain access to the poisoned bait. Therefore a locking mechanism is preferably provided to lock the lid portion to a lower housing of the bait station. This may consist of two separate locks, each of which must be opened simultaneously, thus improving security. In one embodiment each lock includes a plurality of stepped flanges on either the lid portion or the lower housing and a plurality of cooperating teeth on the other of the lid portion and the lower housing. In this case a special key is used to take the flanges out of cooperation with the teeth and allow the box to be opened.

DETAILED DESCRIPTION OF PREFERRED EMBODIMENT

Figure 1:
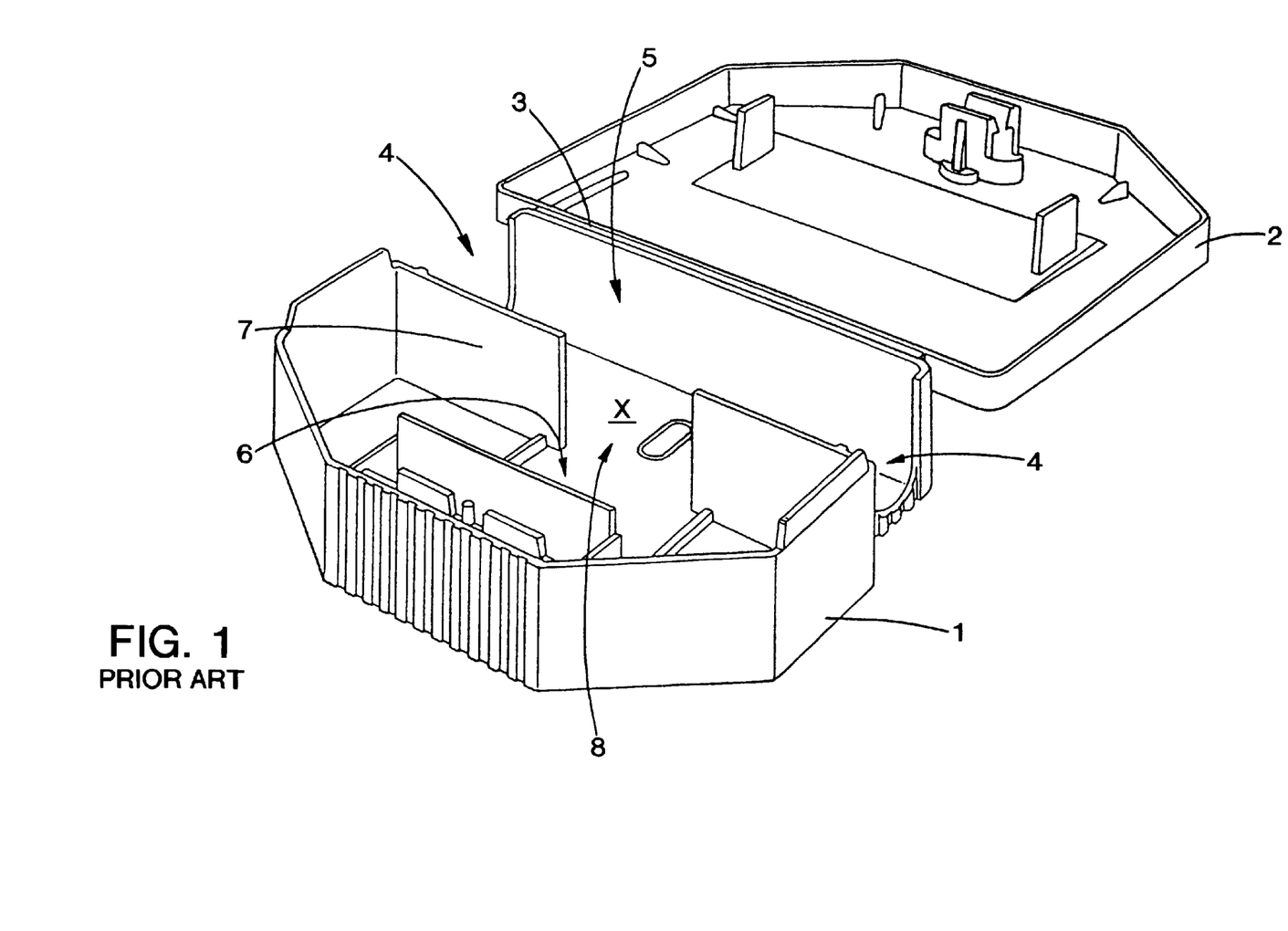
FIG. 1 is a perspective view of a prior art bait station.

Referring to FIG. 1, a prior art bait station consists of an enclosure made up of a lower housing 1 and a lid 2. The lid 2 is flexibly attached to the lower housing by a plastic hinge 3. The lower housing includes two openings 4 which form a passageway 5 therebetween. A feeding compartment 6 is separated from the passageway by a divider 7 which has one central opening 8. Bait is left in the feeding compartment 6 and a mouse or rat enters the feeding compartment 6 via the passageway 5 and the central opening 8 to eat the bait. A mouse feels safe eating bait in the enclosed feeding compartment 6 and will eat its fill. Before the present invention it was thought that a rat also preferred to eat its food in such an enclosed compartment.

Figure 2:
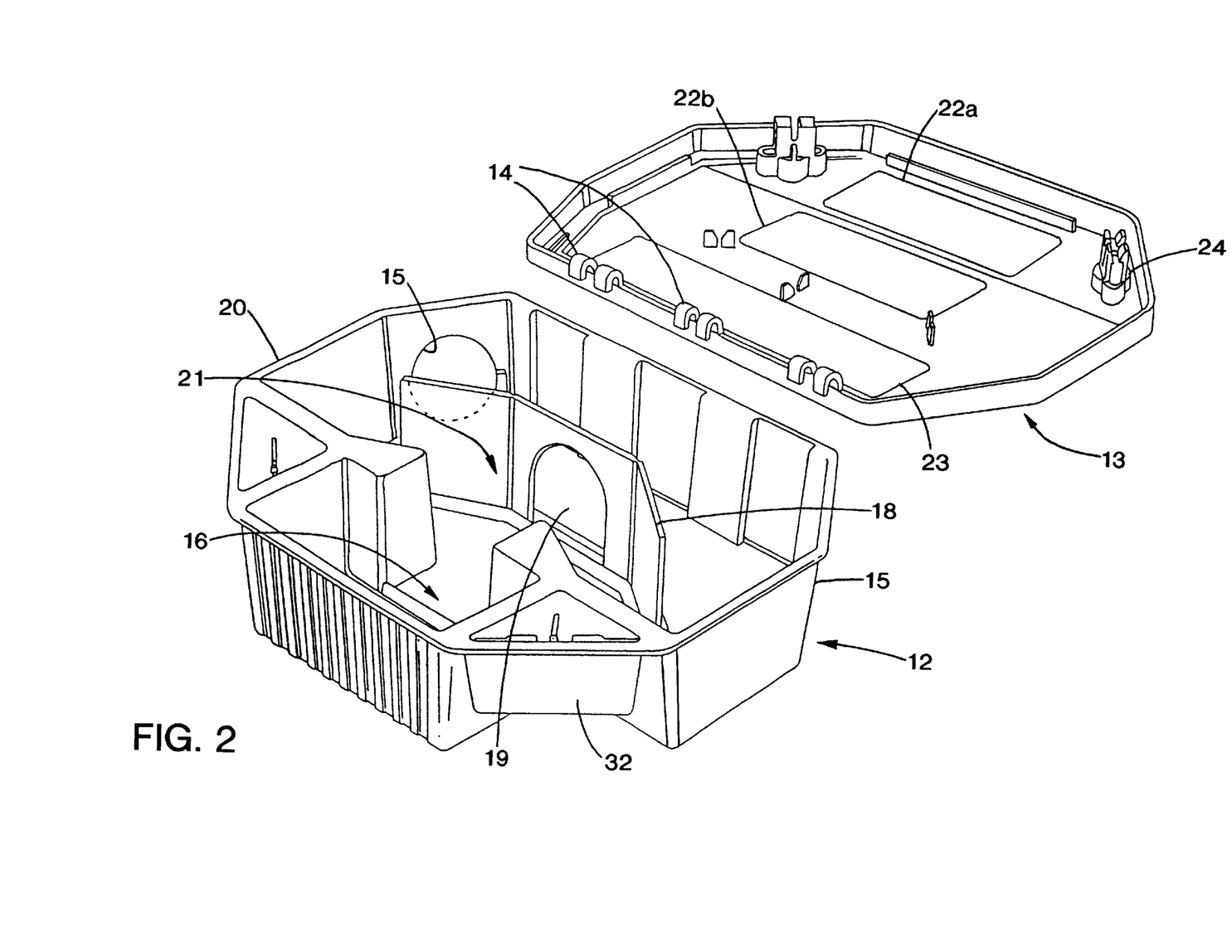
FIG. 2 is a perspective view of a bait station according to the invention in an open position with the lid detached.

FIG. 2 shows a bait station according to the invention, specifically designed for a rat. This bait station consists of an enclosure made up of a lower housing 12 and a lid 13. The lower housing 12 and the lid 13 are moulded separately from polypropylene, and have a thickness of around 1–1.5 mm. Making these components separately makes it possible to stack the boxes efficiently prior to assembly. The lid 13 is attached to the lower housing 12 by hinges 14. The plastic around the hinges is thickened to give extra strength.

The lower housing includes two circular openings 15 (only one of which is visible in FIG. 2). The openings 15 are positioned such that a rat can see right through the box from one side to the other.

Figure 3:
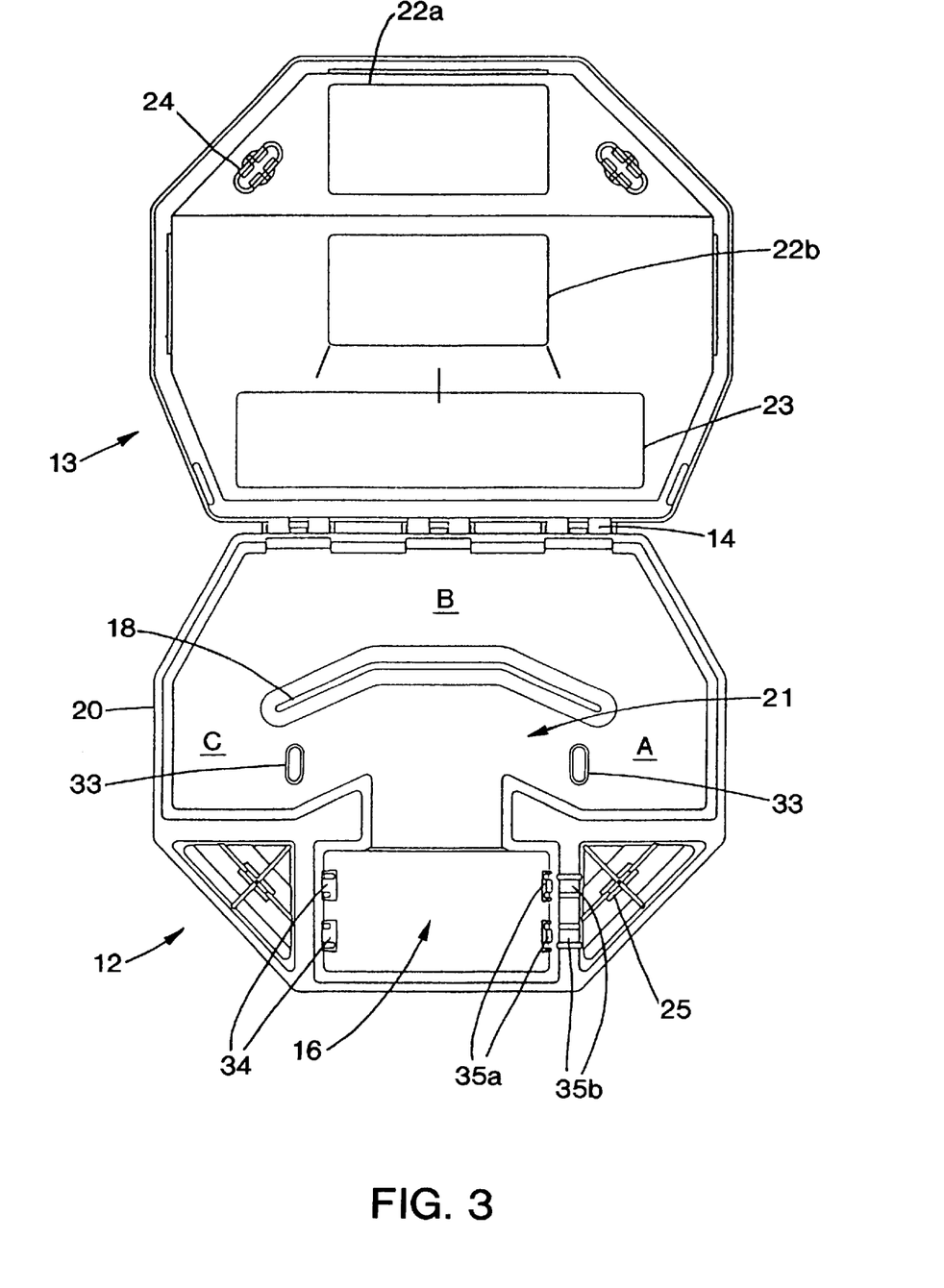
FIG. 3 is a top view of the bait station of FIG. 2 in an open position.
Figure 4:
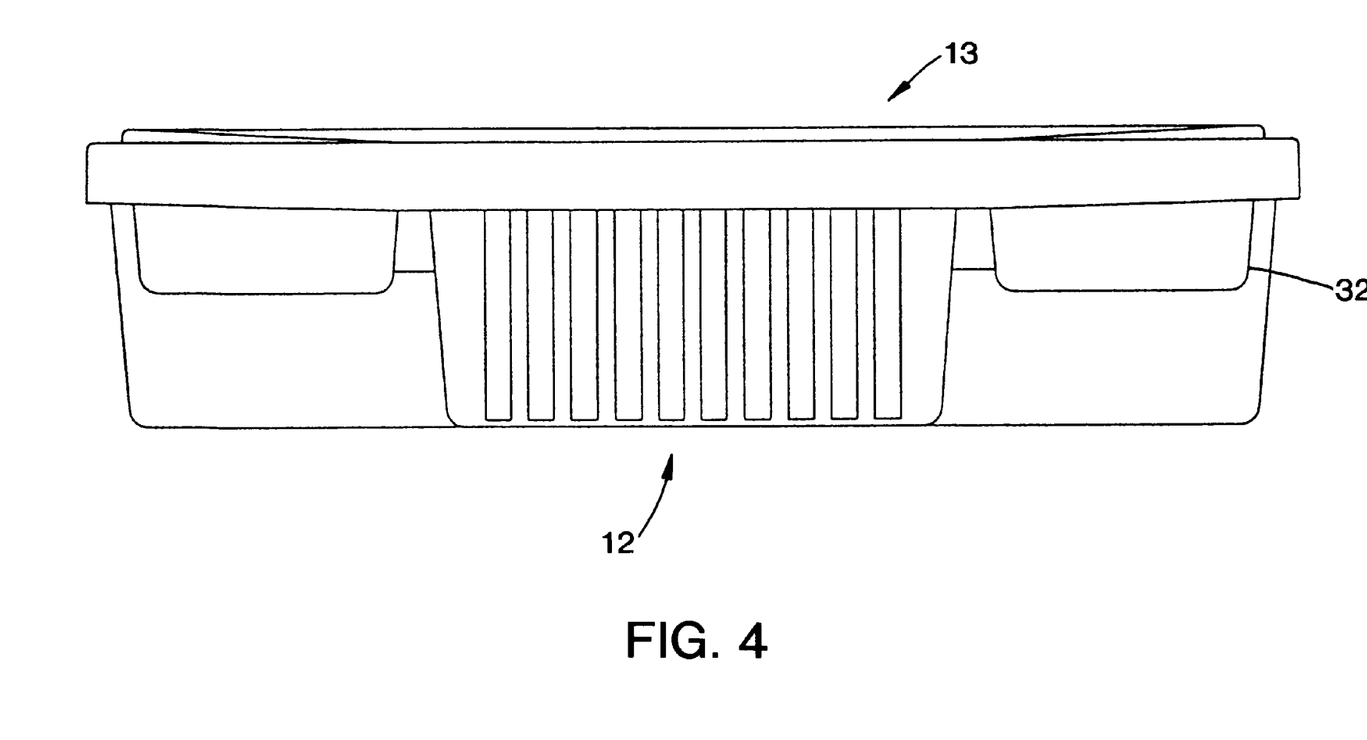
FIG. 4 is a front view of the bait station of FIG. 2.
Figure 5:
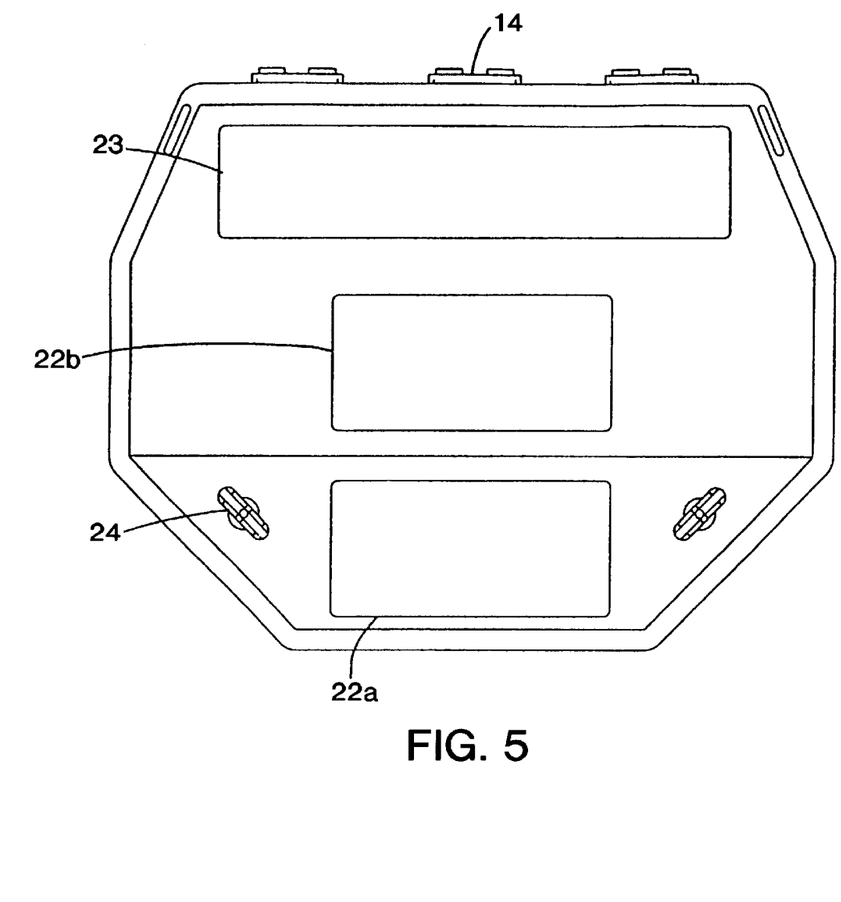
FIG. 5 is a top view of the bait station of FIG. 2 in a closed position.
Figure 6:
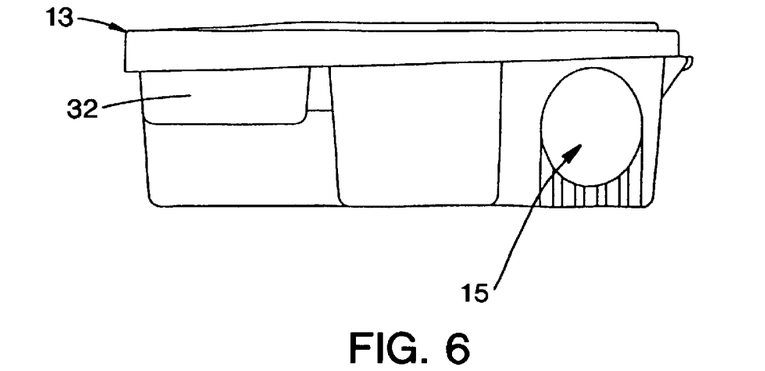
FIG. 6 is a side view of the bait station of FIG. 2.
Figure 9:
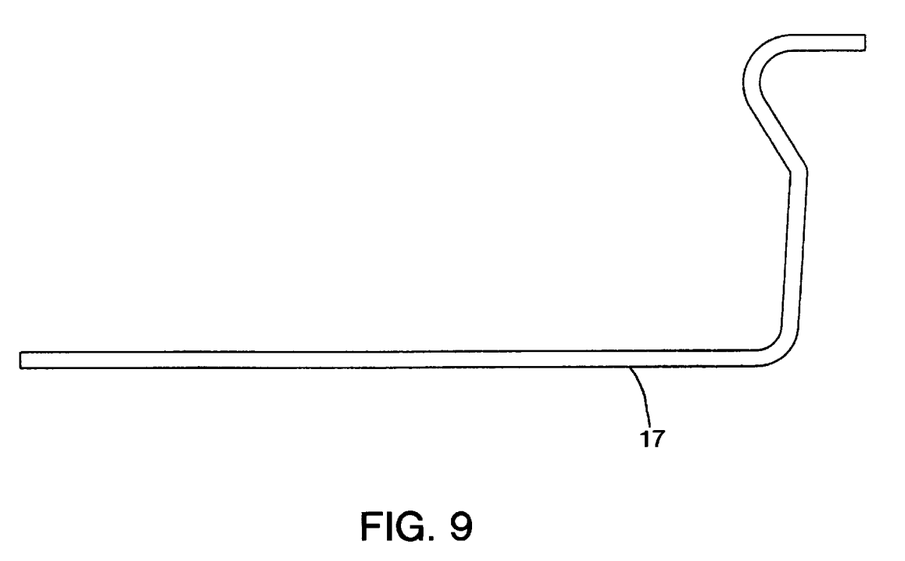
FIG. 9 shows a rod suitable for positioning bait within the bait station of FIG. 2.

The bait station includes a feeding area 16 in which a poisoned bait may be located. This is preferably done by threading a solid block bait onto a piece of wire 17, shown in FIG. 9, and clipping the wire into one of two sets of slots 34 and 35a,b in the feeding area 16 (See FIG. 3). The bait station may receive several baits in its feeding area. Alternatively, if loose grain poisoned bait is used, the box is secured to the floor so that the bait cannot possibly be shaken out of the box.

Figures 7A, 7C:
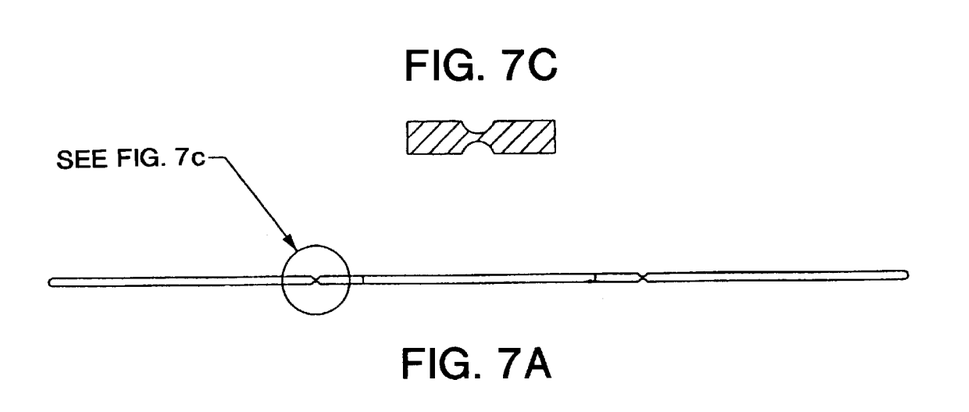
FIG. 7A is a top view of an insert suitable for use with the bait station of FIG. 2.
Figure 7B:
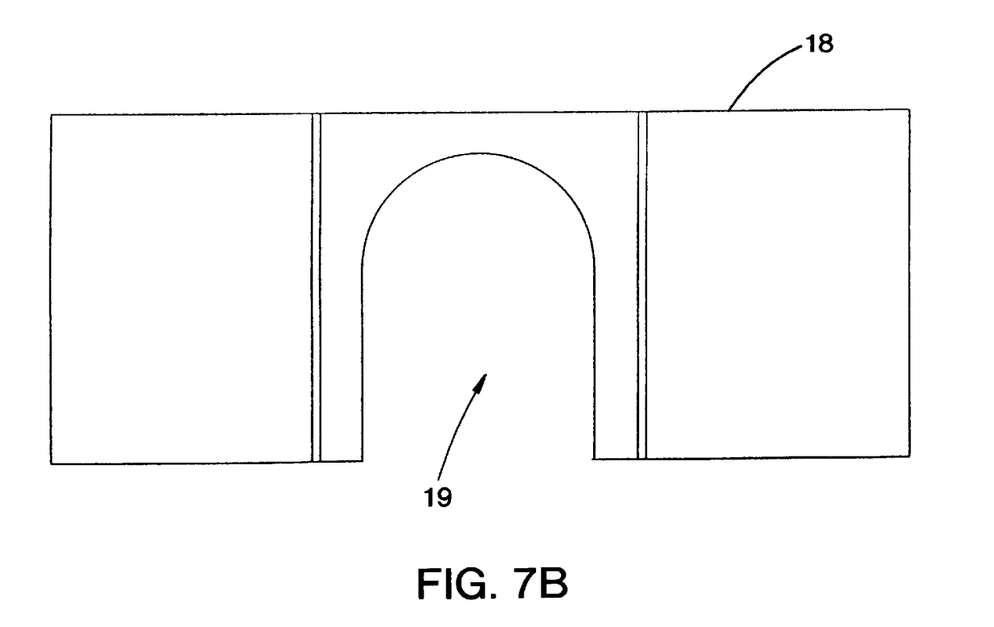
FIG. 7B is a side view of such an insert.

Located between the openings 15 and the feeding area 16 is a central divider 18, which is removable so that the bait stations may be easily stacked. This divider prevents children or pets reaching into the bait station and obtaining access to the poisoned bait. The divider 18 is so positioned and sufficiently large that it is impossible to push a probe through either of the openings 15 to reach the bait. In the illustrated example the divider includes a central hole 19, and does not extend to the walls 20 of the lower housing 12. The divider may be formed initially flat, as shown in FIGS. 7A and 7B, and then be bent before being fitted into place in the bait station.

When feeding, a rat sits in an inner passageway 21 formed by the divider 18, with its head and possibly shoulders extending into the feeding area 16. The rat feels safe in this position because, should it be approached by another rat, it has three possible routes of escape from the bait station. For example, if a second rat should appear in area A (FIG. 3) the feeding rat could escape via area C, or through the central hole 19 in the divider 18 to area B. This is in contrast to the prior art bait station of FIG. 1 where any rat sitting in the feeding chamber 6 is effectively trapped. If a second rat should approach in area X, there is no escape route for the feeding rat.

The lid 13 includes transparent plates 22a, 22b and 23. Plates 22a and 22b allow an inspector to see whether the bait needs replacing and whether there is a rat inside the bait station, without opening the lid. Plate 23 is used for the recording of information. A plain label is placed on the underside of the lid and the top of the lid can be written on and subsequently wiped clean. Thus, information such as when the bait station was last inspected, and by whom, can be recorded on the lid.

Figure 8:
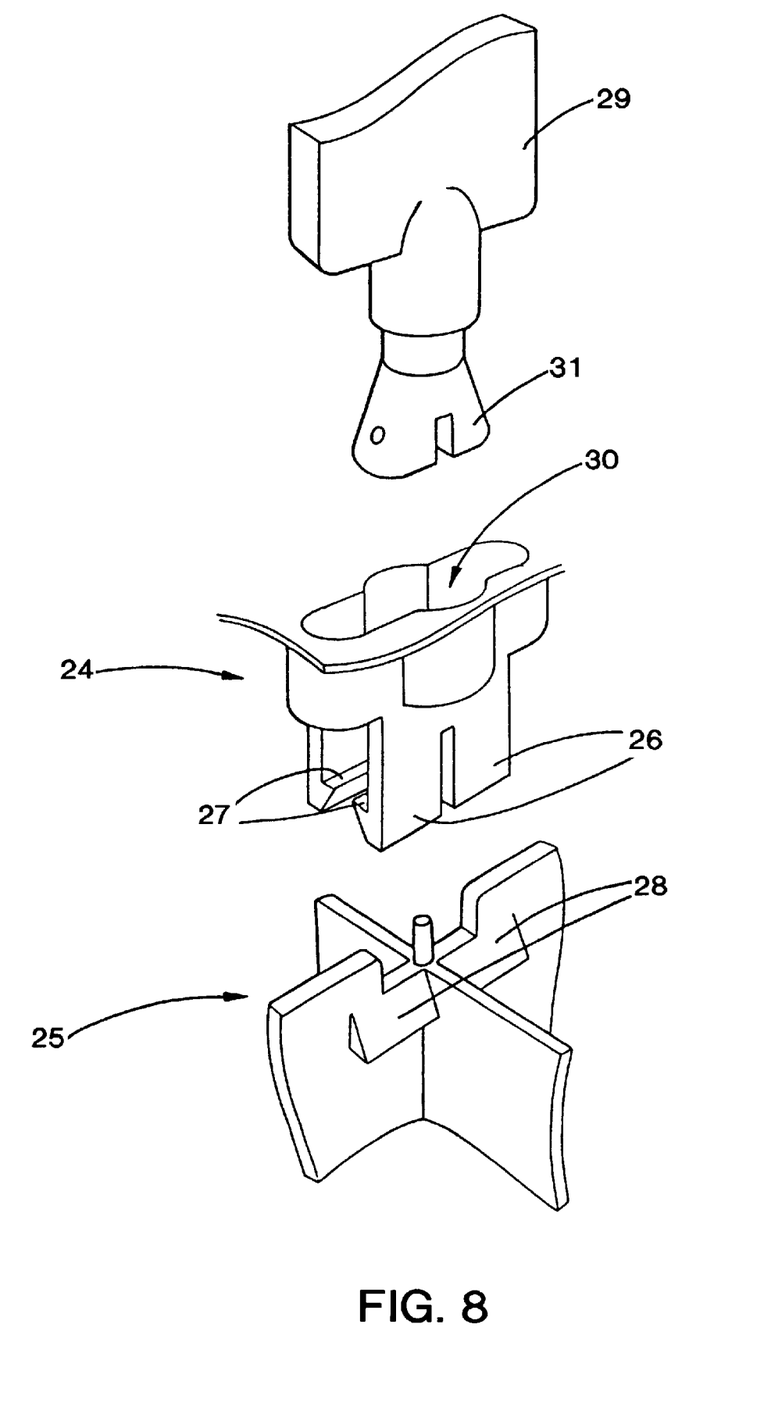
FIG. 8 is an exploded perspective view of the components of a locking device for a bait station according to the invention.

The bait station includes two locking mechanisms, one of which is shown in detail in FIG. 8. It is important that children cannot open the bait station so the locks must be very difficult to tamper with.

When the bait station is closed by bringing the lid 13 down onto the lower housing 12, two upper lock portions 24 attached to the lid 13 are brought down onto two lower lock portions 25 attached to the lower housing 12.

Each upper lock portion 24 includes four flanges 26, each containing a ramp on its underside producing a step 27 on the inside of the flange. Each lower lock portion includes four teeth 28 of complementary shape to the stepped flanges 26 of the upper lock portion. As the lid 13 of the bait station is closed, each upper lock portion is forced onto its corresponding lower lock portion so that the flanges 26 clip into place with their steps 27 located under the teeth 28.

To open the bait station, a key 29 is inserted into a hole 30 in each upper lock portion 24 and twisted. Because the key includes an oval portion 31, this twisting prises apart the four flanges 26 of each upper lock portion 24 sufficiently that their steps 27 are no longer retained under the teeth 28. The lid 13 can then be lifted to gain access to the inside of the bait station.

Each bait station includes two complete locking mechanisms, each with four co-operating flanges and steps. Thus, to open the bait box without two keys it would be necessary to prize open eight flanges at once. It is extremely difficult to gain access to any of the flanges which are enclosed in lock housings 32, so the bait station is effectively tamper-proof.

The lid 13 of the bait station also fits very closely to the lower housing 12 so that an implement such as a screwdriver cannot be used to prise the lid open.

The bottom of the lower housing 12 includes slits 33 for fixing the bait station to a floor. There may also be slits in the back of the bait station for attaching it to a wall.

What is claimed is:

1. A bait station for containing poison bait for rats, said bait station comprising a housing comprising a base, opposed walls upstanding from the base, and a cover over said walls defining an enclosure, said housing additionally comprising a first portion in said enclosure a rat bait position located in said first portion and a second portion in enclosure and a second portion in said enclosure laterally spaced from said first portions, first and second openings in respective opposed walls in the second portion of the housing, said openings extending upwardly from said base, said first and second openings having a substantially unobstructed line of view therebetween and providing entrance and exit passages to or from the exterior of the housing for a rat into and out of said second portion of said housing, a divider comprising a wall upstanding from said base to said cover between said first and second portions, said divider having opposed ends;

a pair of spaces between the opposed ends of the divider and the respective opposed walls of the housing, said divider in said enclosure defining first and second separate generally parallel passageways for a rat in said first and second portions, respectively, and said pair of opposed spaces defining entrance and exit passages between said first and second passageways to provide multiple paths of entrance and escape for a rat to and from the bait position, said first passageway leading from said spaces to said bait and said second passageway extending between said openings and leading to said first passageway by way of said first and second openings; and upstanding walls along said first passageway and spaced laterally from said divider wall to define a feeding area spaced laterally from said first passageway and accessible only from said first passage.

2. The bait station of claim 1 wherein an additional entrance and exit passage for a rat is provided in a central portion of the divider.

3. The bait station of claim 1 wherein said substantially unobstructed line of view is substantially parallel to one side of said divider.

4. The bait station of claim 1 wherein said divider is transparent.

5. The bait station of claim 1 wherein at least a portion of the housing is transparent.

6. The bait station of claim 1 wherein at least a portion of the cover is transparent.

7. The bait station of claim 1 wherein said cover is pivotally attached to said housing, and is movable between an open and closed position, and the bait station comprises means for locking the cover in the closed position.

8. The bait station of claim 7 wherein said means for locking the cover comprises a plurality of stepped flanges engageable with complementary teeth in a locking position.

9. The bait station of claim 8 wherein key means are provided for disengaging said teeth from said flanges to unlock the cover.

10. The bait station of claim 1, further including an opening in said divider between said spaces providing additional access from said second passageway to said first passageway.

11. A bait station for containing rodent poison, said bait station comprising a housing, an opening in the housing, a cover on said housing, and lock means between said cover and said housing for releasably locking said cover to said housing, said lock means comprising two opposed adjacent pairs of barbs extending from said cover, and two opposed adjacent pairs of ledges in said housing, said barbs being resiliently lockable against said ledges, and a key for unlocking said barbs from said ledges, said key having ends and a longitudinal axis, a pair of lobes at one end of the key, said key being insertable in said opening and rotatable around its longitudinal axis to exchange said lobes with the barbs and to simultaneously release all of said barbs from said ledges.

12. A bait station for containing poison bait for rats, said bait station comprising an enclosure including a base, a cover and opposed side walls, a first portion and a second portion in said enclosure, a pair of spaced openings in said opposed side walls in said second portion of said enclosure, with a clear line of sight between said openings, a divider between the first and second portions of said enclosure, said divider extending substantially parallel to said line of sight, said divider defining first and second passageways for a rat in said first and second portions, respectively, at least first and second spaced openings around said divider defining entrance and exit openings for a rat between said first and second passageways, and upstanding walls along said first passageway and spaced laterally from said divider wall to define a feeding area spaced laterally from said first passageway and accessible only from said first passage whereby the rat has multiple avenues of entrance and escape to and from the feeding area.

13. The bait station of claim 12 wherein said divider and said cover are removably secured in said enclosure, and wherein a plurality of said enclosures are restable upon removal of said cover and divider.

* * * * *

UNITED STATES PATENT AND TRADEMARK OFFICE
CERTIFICATE OF CORRECTION

PATENT NO. : 6,082,042
DATED : July 4, 2000
INVENTOR(S) : Nicholas Issitt

It is certified that error appears in the above-identified patent and that said Letters Patent is hereby corrected as shown below:

Column 4,
Line 43, after enclosure insert -- , --
Line 46, "portions" should be "portion"
Line 66, after "bait" insert -- , --

Column 6,
Line 31, "restable" should be "nestable"

Signed and Sealed this

Eleventh Day of December, 2001

Attest:

NICHOLAS P. GODICI
Attesting Officer    Acting Director of the United States Patent and Trademark Office